6/17/80 OR 4,208,100

United States Patent [19]

Bischl

[11] 4,208,100

[45] Jun. 17, 1980

[54] APPARATUS FOR CONTROLLING THE CROSS SECTION OF A BEAM OF LIGHT

[76] Inventor: Johann Bischl, Volkartstr. 17, 8000 Munich 19, Fed. Rep. of Germany

[21] Appl. No.: 880,384

[22] Filed: Feb. 23, 1978

[30] Foreign Application Priority Data

Mar. 9, 1977 [DE] Fed. Rep. of Germany ... 7707291[U]

[51] Int. Cl.2 ............ G05D 25/00

[52] U.S. Cl. ............ 350/272; 362/281; 362/321

[58] Field of Search ............ 350/17, 271, 272; 362/255, 280, 281, 321

[56] References Cited

U.S. PATENT DOCUMENTS 1,767,756 6/1930 Hall ............ 362/321 X
2,076,240 4/1937 Levy ............ 362/281
3,116,022 12/1963 Davis ............ 362/294
3,307,028 2/1967 Bentham ............ 362/281

*Primary Examiner*—John K. Corbin
*Assistant Examiner*—Matthew W. Koren
*Attorney, Agent, or Firm*—Toren, McGeady and Stanger

[57] ABSTRACT

The cross section of a beam of light may be controlled by three spacedly superimposed circular plates formed with respective, central apertures circular about the axis of the passage defined by the aligned apertures. The central plate defines with the two outer plates respective gaps in each of which two slides may be moved toward each other into a position in which they jointly block the passage, the paths of the two pairs of slides being perpendicular to each other. Springs hold the stack of plates and slides together so that the slides are guided by the plates bounding the corresponding gap, but thermal expansion of the elements of the stack does not interfere with the mobility of the slides which may be adjusted manually.

8 Claims, 5 Drawing Figures

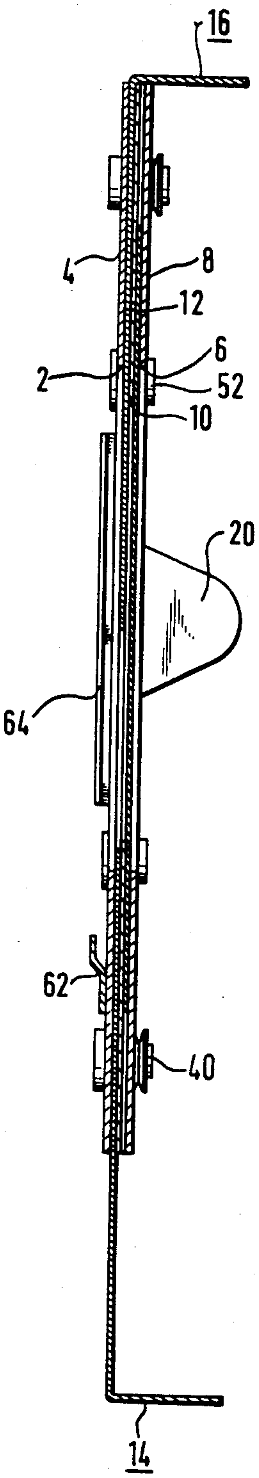
Fig. 2
Fig. 4
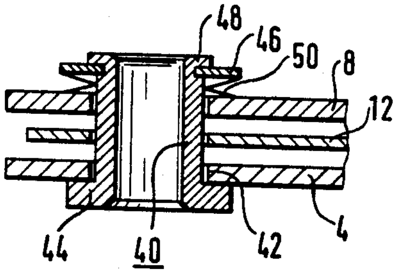
Fig. 5
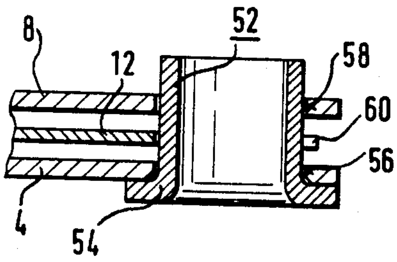

APPARATUS FOR CONTROLLING THE CROSS SECTION OF A BEAM OF LIGHT

This invention relates to apparatus for controlling the cross section of a beam of light and will be described hereinbelow with reference to a device for controlling the beam of light generated by a searchlight or spotlight.

Elaborate equipment is available for remotely controlling the output of stage lights, but professional, theatrical lighting systems are not affordable for many other applications in which the intensity of the light emitted from a light source needs to be adjusted from time to time, manual control is necessary, and control of the energy input to each light source is not possible. Diaphragms provided with variable apertures have been suggested, but tend to jam under the thermal stresses induced by the portion of the light beam which is absorbed by the diaphragm.

It is a primary object of this invention to provide apparatus for controlling the cross section of a light beam which permits adjustments to be made in the available aperture of a diaphragm assembly even as the temperature of the apparatus is raised by absorbed energy of the beam.

With this object and others in view, as will hereinafter become apparent, the apparatus of the invention includes three plates formed with respective apertures therethrough. Securing devices secure the plates in spacedly parallel relationship in a position in which their apertures are aligned to define a straight passage through the plates, whereby a central plate is interposed between the two other, outer plates and defines with the two outer plates respective gaps. A first slide is mounted in one of the gaps for movement in a certain direction toward and away from a position in which the first slide obstructs at least a portion of the passage through the plates. A second slide is similarly mounted in the other gap for movement in a direction angularly offset from the direction of movement of the first slide. During their movement, the slides are engaged simultaneously and guided by the central plate and by respective outer plates.

Other features, additional objects, and many of the attendant advantages of this invention will readily be appreciated as the same becomes better understood by reference to the following detailed description of a preferred embodiment when considered in connection with the appended drawing in which:

FIG. 2 illustrates the device of FIG. 1 in fragmentary side-elevational section on the line II—II;

FIGS. 4 and 5 show details of the apparatus in respective, enlarged sections on the lines IV—IV and V—V in FIG. 1.

Figure 1:
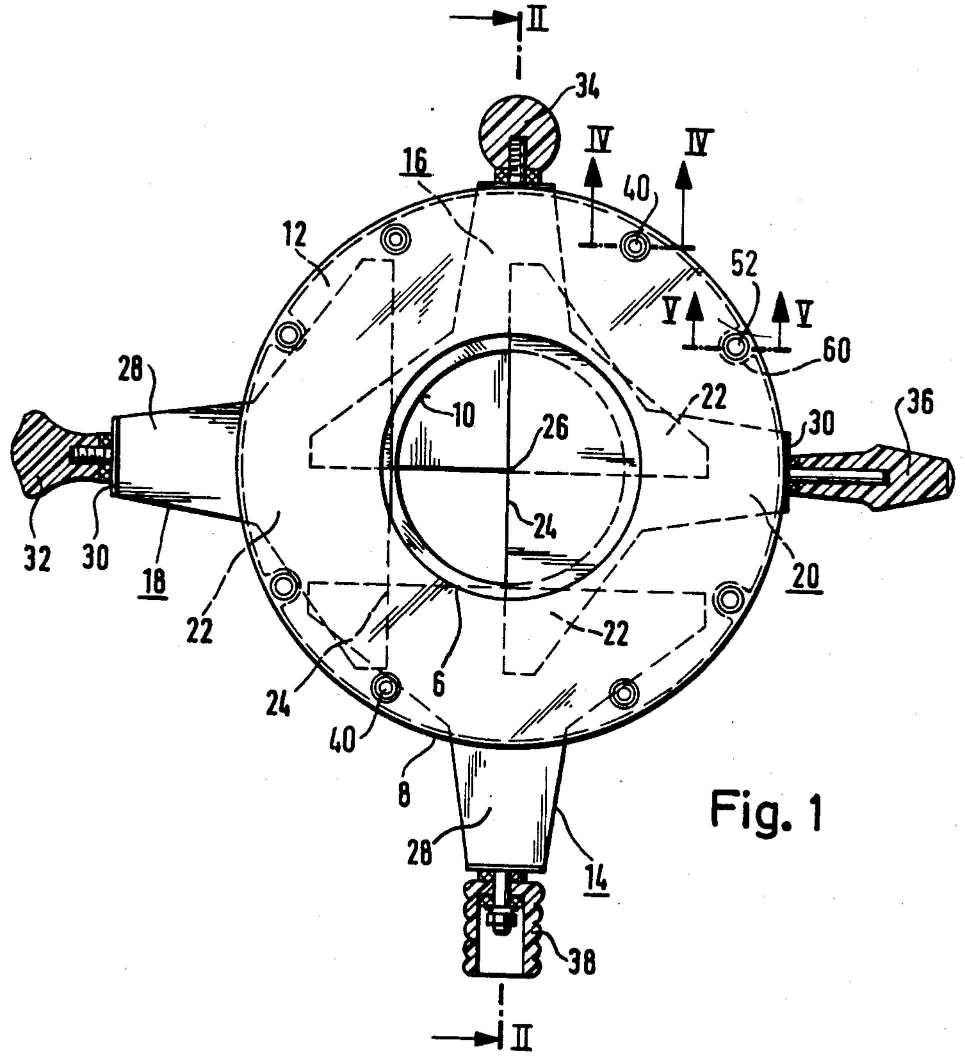
FIG. 1 shows a light control device of the invention in rear elevation.
Figure 3:
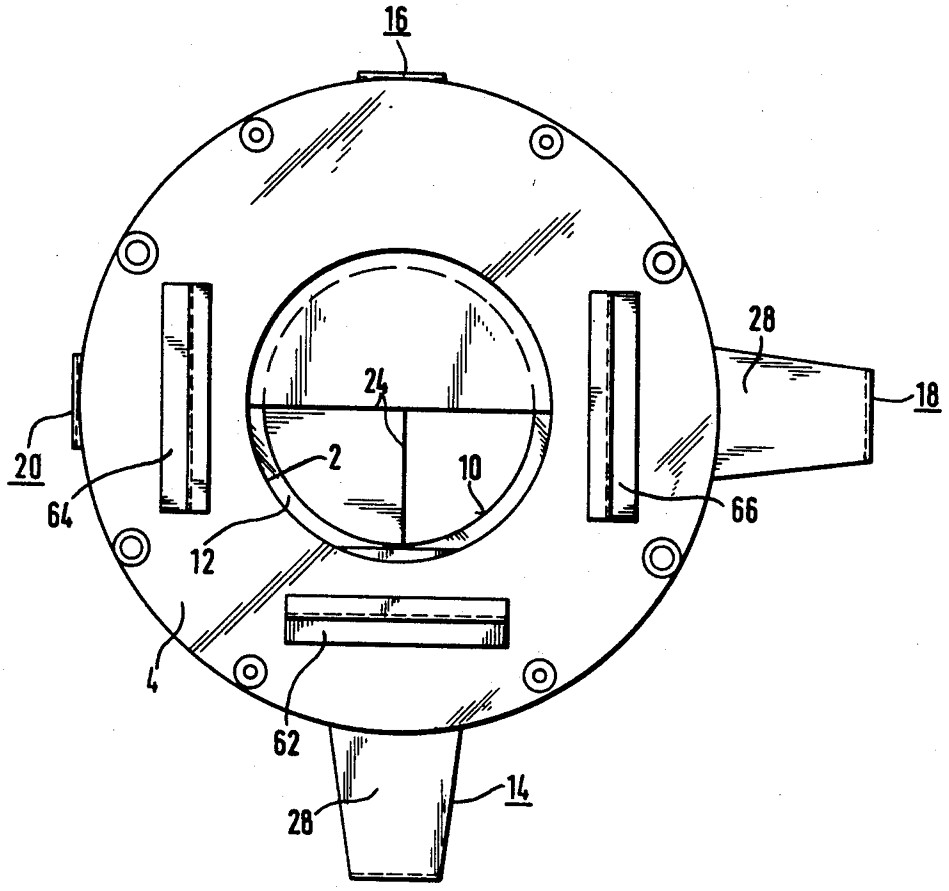
FIG. 3 is a fragmentary, front-elevational view of the apparatus of FIG. 1.

Referring now to FIGS. 1 to 3, there are shown three circular, sheet metal plates 4, 8, 12 equal in diameter and formed with respective, central, circular apertures 2, 6, 10. As will presently be described in more detail the plates are secured to each other in spacedly parallel relationship by hollow rivets 40, flanged sleeves 52 and associated devices in such a manner that the central plate 12 axially bounds two gaps which are defined in a direction away from the central plate 12 by the outer plates 4, 8 respectively. The aperture 10 in the central plate 12 is somewhat smaller in diameter than the aligned aperture 2 of the rear plate 4 and the aperture 6 of the front plate 8.

The narrow gap between the plates 4, 12 accommodates two sheet metal slides 14, 16, whereas two slides 18, 20 are received in the gap between the plates 12, 8. Each slide has an inner portion 22 adjacent the common axis 26 of the apertures 2, 6, 10 which has the approximate shape of an isoceles triangle. The edge 24 which defines the straight base of the triangle faces the corresponding at least approximately parallel edge of the other slide in the same gap between the plates 4, 12, 8. The sides of each triangular portion 22 converge at an obtuse angle toward an apex which is obscured by an integral tongue portion 28 of the slide. The relatively narrow tongue portion 28 projects radially outward beyond all three plates 4, 12, 8 in all operative positions of the slides. It tapers from the slide portion 22 toward the free end of the tongue portion which is offset as a lug 30 at right angles to the respective radial planes of the plates and of the slides, as is best seen in FIG. 2 with respect to the slides 14, 16, 20.

Handles 32, 34 ,36, 38 of thermal insulating, thermosetting plastic are fastened to the four lugs 30 respectively and are differently shaped to facilitate identification of the associated slides.

The four hollow rivets 40 define a rectangle elongated in the direction of radial movement of the slides 14, 16, and they flank the paths of these slides so that each slide is automatically centered between a pair of associated rivets 40 by engagement of the converging edges of its triangular portion 22 when the slide is pulled radially outward. The four flanged sleeves 52 define an analogous rectangle and cooperate with the slides 18, 20, as the rivets 40 cooperate with the slides 14, 16.

As is evident from FIG. 4, the rivet 40 initially had a stepped cylindrical shape including a flange 44 at one axial end and a reduced portion at the other end. During assembly with the plates 4, 12, 18, the reduced end was passed sequentially through an opening 42 in the plate 4, aligned openings in the plates 12, 8 central openings in two cup springs 50, and finally a washer 46. Thereafter the free, reduced end of the rivet 42 was peened over the washer 46 as another flange 48, thereby compressing the springs 50. The springs move the plates 8, 12 as far toward the front plate 4 as permitted by the interposed slides 14, 16, 18, 20, not themselves visible in FIG. 4.

Each sleeve 52 is provided with a fixed radial flange 54 at one axial end, and spot welds 56, only partly shown, fasten the flange 54 to the outer face of the plate 4. The sleeve 52 then passes through a notch 60 of the central plate 12 which is open in a radially outward direction, and a slightly oversized bore 58 of the rear plate 8.

Two vertically elongated sheet metal brackets 64, 66 are fixedly fastened to the front face of the plate 4 in parallel alignment on opposite sides of the passage through the apertures 2, 6, 10 and permit a rectangular filter plate to be slid downward over the face of the plate 4 into a position in which it covers the passage through the plates, the filter plate being retained in its position also by a horizontally elongated bracket 62 otherwise identical with the brackets 64, 66.

The rivets 40, sleeves 52, and associated elements not only secure the plates 4, 8, 12 in the necessary spacedly parallel relationship in the illustrated position in which the apertures 2, 6, 10 are aligned to define a passage for the light beam to be controlled. They also act as guides which guide the slides in respective paths substantially perpendicular to each other when the slides are moved by the respective manually operable handles 32, 34, 36, 38.

The rivets 40 and sleeves 52 in cooperation with the associated elements described with reference to FIGS. 4 and 5 permits limited movement of the plates toward and away from each other in a manner to increase and decrease the respective widths of the gaps therebetween, as may be called for by thermal expansion. The yieldably resilient cup springs 50 bias the plates toward a relative position in which the width of each gap is at a minimum, thereby ensuring guiding engagement of the plates with the slides.

The rivets 40 and sleeve 52 also prevent all angular movement of the certral plate 12 relative to the two outer plates 4, 8 about the axis 26. Yet the notches 60 permit some differential, thermal, radial expansion of the central plate 12 relative to the outer plates 4, 8 without warping of the entire apparatus.

The tubular rivets 40 and sleeves 52 additionally function as elements of a mounting arrangement in which the rear plate 8 is mounted directly on the front face of a search light or spot light by means of screws passing through the bores of the rivets and sleeves.

While the slides 14, 16, 18, 20 have been described to consist of sheet metal, the use of slides at least partly consisting of glass is specifically contemplated. One pair of transparent or translucent glass slides may cooperate with a pair of opaque sheet metal slides, the slides of both pairs may consist of glass varying in color and/or light transmittancy, and other combinations will readily suggest themselves to meet specific requirements.

It is a common feature of the several modifications of this invention that they permit easy manual adjustment of the beam emitted from a constant light source even if the plates and slides reach a temperature much above ambient temperature.

It should be understood, of course, that the foregoing disclosure relates only to a presently preferred embodiment, and that it is intended to cover all changes and variations in the example of the invention herein chosen for the purpose of the disclosure which do not constitute departures from the spirit and scope of the invention set forth in the appended claims.

What is claimed is:

1. Shutter apparatus for a light source comprising: a first, a second and a third plate member each having an aperture therethrough, said plate members being arranged in generally parallel adjacent planes with said second plate member between said first and said third plate members and with said apertures aligned to define a light path; securing means mounting said plate members together in spaced juxtaposition with a first gap defined between said first and said second plate members and with a second gap defined between said second and said third plate members; first shutter means comprising slide means mounted in said first gap for guided movement between said first and said second plate members transversely of the direction of said light path; second shutter means comprising slide means mounted in said second gap for guided movement between said first and said second plate members transversely of the direction of said light path; resilient means interposed as part of said securing means for resiliently securing said plate members together to facilitate operative movement of said first and said second shutter means within said first and said second gaps, respectively, and mounting means for mounting one of said first and said third plate members on a light source, and retaining means on the other of said first and said third plate members for retaining a light permeable filter in alignment with said light path.

2. Apparatus according to claim 1 further comprising guide means for guiding said slide means of said first and said second shutter means in respective paths substantially perpendicular to each other during said guided movements thereof.

3. Apparatus according to claim 1 wherein said slide means of said first shutter means comprise a first pair of slides mounted in said first gap for movement transversely of the direction of said light path toward and away from each other and wherein said slide means of said second shutter means comprise a second pair of slides mounted in said second gap for movement toward and away from each other.

4. Apparatus according to claim 3 further comprising manually operable means on each of said first and said second pair of slides projecting beyond said plate members for enabling said slides to be manually moved inwardly and outwardly of said first and second gaps, respectively, toward and away from said light path.

5. Apparatus according to claim 1 wherein said apertures of said plate members define respective cross-sectional areas of said light path, the cross-sectional area defined by the aperture of said second plate member being smaller than the cross-sectional areas defined by the respective apertures of said first and third plate members.

6. Apparatus as set forth in claim 5, wherein said apertures are circular about a common axis perpendicular to said plate members.

7. Apparatus according to claim 1 wherein said resilient means are arranged to permit limited movement of said plate members toward and away from each other in a manner to increase and decrease said first and second gaps, said resilient means biasing said plate members toward a relative position wherein the width of each of said first and said second gaps is at a minimum.

8. Apparatus according to claim 7 wherein said securing means further include means for preventing angular movement of said second plate member relative to at least one of said first and said third plate members about an axis transverse to said adjacent planes of said plate members.

* * * * *